United States Patent

Atkinson et al.

[11] Patent Number: 5,308,088
[45] Date of Patent: May 3, 1994

[54] BRUSH SEAL WITH FLEXIBLE BACKING PLATE

[75] Inventors: Edward Atkinson, Morrow; Brent L. Bristol, Milford, both of Ohio

[73] Assignee: General Electric Company, Cincinnati, Ohio

[21] Appl. No.: 932,823

[22] Filed: Aug. 20, 1992

[51] Int. Cl.[5] .............................................. F16J 15/32
[52] U.S. Cl. ........................................ 277/53; 277/198
[58] Field of Search .................... 277/53, 55, 56, 216, 277/192, 198; 415/23 C, 174.5

[56] References Cited

U.S. PATENT DOCUMENTS

| Re. 30,206 | 2/1980 | Ferguson et al. |
|---|---|---|
| Re. 30,600 | 5/1981 | Long et al. |
| 885,032 | 4/1908 | De Ferranti |
| 2,878,048 | 3/1959 | Peterson |
| 3,917,150 | 11/1975 | Ferguson et al. |
| 4,202,554 | 5/1980 | Snell |
| 4,204,629 | 5/1980 | Bridges |
| 4,218,189 | 8/1980 | Pask |
| 4,265,455 | 5/1981 | Lundgren |
| 4,269,420 | 5/1981 | Persson |
| 4,358,120 | 11/1982 | Moore |
| 4,411,594 | 10/1983 | Pellow et al. |
| 4,415,309 | 11/1983 | Atterbury |
| 4,595,207 | 6/1986 | Popp |
| 4,600,202 | 7/1986 | Schaeffler et al. |
| 4,645,362 | 2/1987 | Orte |
| 4,678,113 | 7/1987 | Bridges et al. |
| 4,696,480 | 9/1987 | Jornhagen |
| 4,755,103 | 7/1988 | Streifinger |
| 4,756,536 | 7/1988 | Belcher |
| 4,781,388 | 11/1988 | Wohrl et al. |
| 4,809,990 | 3/1989 | Merz |
| 4,971,336 | 11/1990 | Ferguson |
| 5,026,252 | 6/1991 | Hoffelner |
| 5,029,875 | 7/1991 | Spain et al. |
| 5,031,922 | 7/1991 | Heydrich |
| 5,174,582 | 12/1992 | Ferguson ............................. 277/53 |

FOREIGN PATENT DOCUMENTS

| 0453315 | 10/1991 | European Pat. Off. ............ 279/53 |
|---|---|---|
| 1049092 | 12/1953 | France ................................. 277/53 |
| 0793886 | 4/1958 | United Kingdom ................. 277/53 |
| 2250789A | 6/1992 | United Kingdom |
| 2250790A | 6/1992 | United Kingdom |
| 92005378 | 4/1992 | World Int. Prop. O. ............ 277/53 |

Primary Examiner—William A. Cuchlinski, Jr.
Assistant Examiner—Daniel G. DePumpo
Attorney, Agent, or Firm—Jerome C. Squillaro; Nathan D. Herkamp

[57] ABSTRACT

The present invention provides a brush seal having upstream and downstream plates that sandwich therebetween a plurality of bristles that sealingly contact a rotating member. The downstream plate includes primary and secondary backing rings with a flexible connection extending between the two rings so as to permit relative radial movement therebetween.

6 Claims, 2 Drawing Sheets

BRUSH SEAL WITH FLEXIBLE BACKING PLATE

The present invention relates in general to turbomachine sealing elements comprising a brush seal and in particular to such a sealing element having a flexible backing ring support that is less subject to damage or to causing damage during transient operating conditions thereof.

BACKGROUND OF THE INVENTION

Gas turbine engines have known a long and successful use in the aircraft industry. More commonly known as jet engines, the gas turbine has made high speed air travel relatively safe and convenient. Air travel is still costly, however, so manufacturers are continuously striving to reduce both manufacturing and operating costs OF the aircraft gas turbine engine.

One of the origins of increased operating cost is leakage of air and other gases through various parts of the engine without extraction of the energy contained in that air and gas. Rotating labyrinth seals have been frequently used in the past to close such leakage gaps. Another candidate for doing so is a brush seal.

A basic brush seal includes a front or upstream plate, a backing or downstream plate, and a bristle pack sandwiched between the two annular plates. The bristle pack extends across a leakage gap that exists between two relatively movable members so that the free ends of the pack sealingly engage the surface of one of the members. The bristle pack creates a torturous flow path for any air or gas leaking from one side of the seal to the other. Usually, one of the movable members is a rotating structure such as a shaft and the other member is a stationary structure of the engine.

The gap between the backing plate and the rotating engine member is usually sized so as to be large enough to accommodate expected operating transient conditions. Since the size of the leakage gap is related to the ability of the seal to perform its intended sealing function, increasing the gap to accommodate engine operating transients affects the ability of the seal to operate. That is, it can be shown that the maximum pressure difference from the upstream side to the downstream side of the seal is an inverse function of the backing plate gap. Thus, as the gap becomes larger, its ability to function effectively declines accordingly. To prevent damage to the seal or to the opposing rotor member during transient conditions, however, the leakage gap must be of a certain minimum size. This minimum size requirement may result in making the brush seal ineffective for a particular desired application even though its use would otherwise be preferred.

Thus, it would be desirable to have a brush seal that was more tolerant of gas turbine engine operating transients so as to be able to experience such transient operating condiditons without damage while maintaining at all other times the desired clearance gap and desired pressure differential between the upstream and downstream sides of the seal.

SUMMARY of THE INVENTION

There is provided by the present invention a brush seal for sealing an annular leakage gap in a gas turbine engine that includes a flexible backing ring. The seal comprises annular spaced apart upstream and downstream plates that sandwich therebetween a plurality of bristles that extend into a sealing engagement with the surface of a rotating engine member. The downstream plate includes a primary backing ring and a secondary backing ring and a flexible connection extending between the two rings so as to permit relative radial movement between two rings. The flexible connection may comprise clusters of bristles. The secondary ring may further include an inwardly disposed abradable rub strip. In still another embodiment, the secondary backing ring may be rigidly affixed to the primary backing ring and comprise a honeycomb material.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
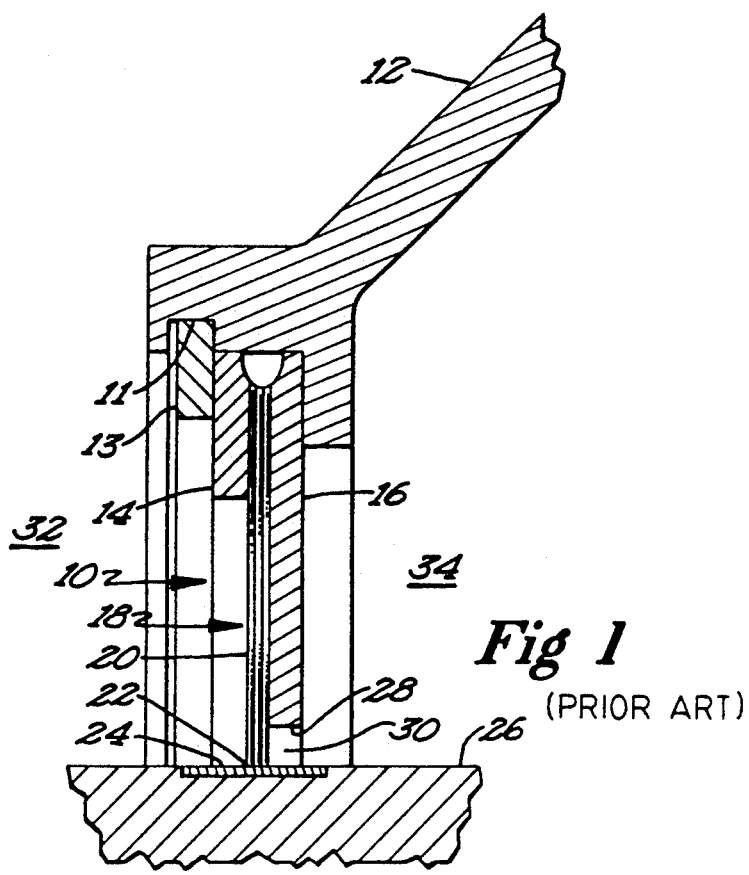
FIG. 1 shows in a side elevation cross sectional view a prior art brush seal disposed between a stationary and a rotating member of a fluid flow machine such as a gas turbine engine.

FIG. 1 shows a prior art brush seal 10 attached to a stationary engine structure 12 such as a gas turbine engine stator structure. Seal 10 includes upstream and downstream plates 14 and 16, respectively, that sandwich therebetween a bristle pack 18 comprising a plurality of bristles 20. Bristles 20 are attached at one end by known means such as welding and the other free ends or tips 22 of bristles 20 sealingly engage a sealing surface 24 disposed on a rotating engine structure or member 26. The individual bristles 20 are usually disposed so as to extend at an angle of about 45° to a radius drawn from the engine center line. In a typical gas turbine engine application, plates 14 and 16 will each have an annular configuration as will bristle pack 18.

Downstream plate 16 includes a radially inner side 28 that is separated from sealing surface 24 by a clearance gap 30. During transient engine operating conditions, such as an eccentric rotation of rotating engine member 26, the size of gap 30 can be reduced or eliminated, resulting in destructive contact between the downstream plate 16 and the rotating member 26. Thus, the gap must be sized to accommodate any such expected transient condition plus provide an additional safety factor. For example, if rotor movement could be expected to be 0.030 inches, the gap should be sized to be 0.030 inches plus a safety margin of, say, 0.010 inches for a total gap size of 0.040 inches. However, it may be desired to create a pressure drop of, say, 200 psi from the upstream side 32 of the seal to the downstream side 34 thereof. This may require a gap of only 0.020 inches. Thus, the desired gap needed for the desired pressure drop will be half of what is necessary to accommodate rotor movement safely. Since the pressure drop is an inverse function of the backplate gap, seal 10 will only be able to seal one-quarter of the desired pressure drop. This reduced pressure drop may be too small for this application and may prohibit the use of the brush seal at this particular engine location.

Figure 2:
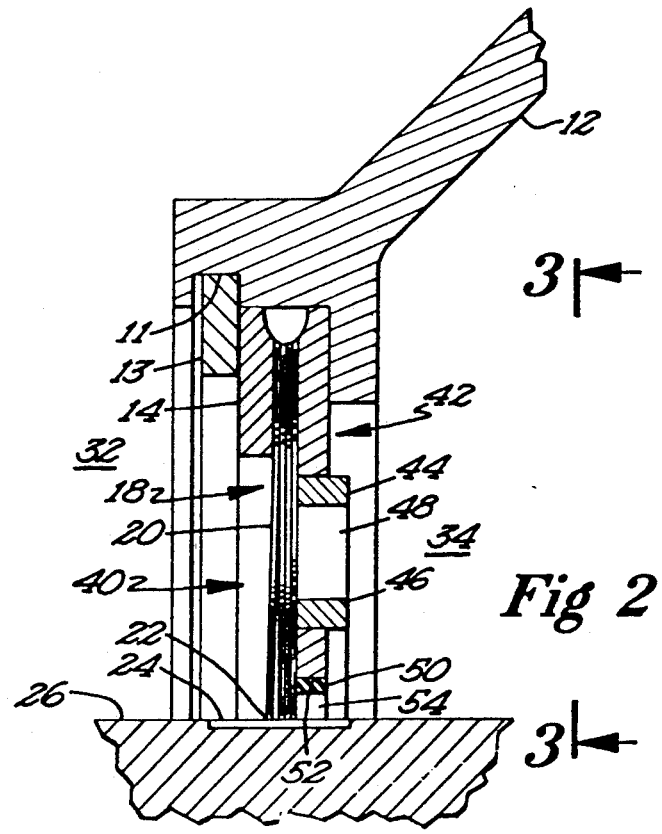
FIG. 2 shows an embodiment of the present invention wherein the downstream seal plate comprises primary and secondary backing rings flexibly connected to each other and further shows an abradable rub strip attached inwardly of the secondary ring.
Figure 3:
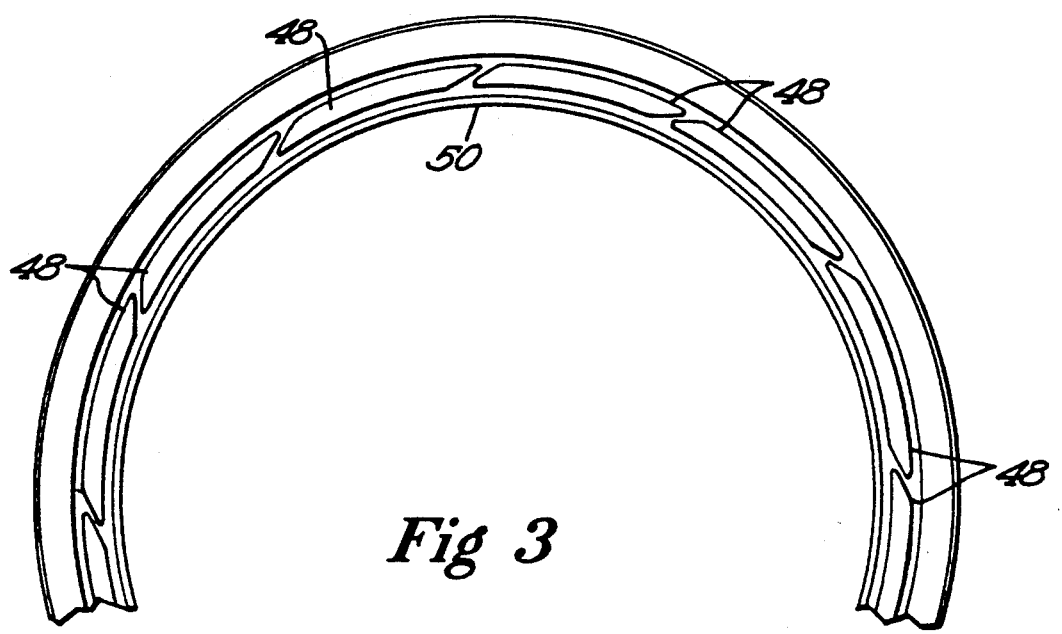
FIG. 3 is an end view of the seal shown in FIG. 2 looking in a downstream to upstream direction.

Referring now to FIGS. 2 and 3, an improved brush seal will be described. Thus, the improved brush seal 40 has an upstream plate 14 and a downstream plate 42 that sandwiches a bristle pack 18 therebetween. Downstream plate 42 includes a primary ring 44 and a secondary ring 46 disposed radially inwardly of primary ring 44. Primary and secondary rings 44 and 46 are interconnected by a flexible coupling means 48. As best seen in FIG. 3, flexible coupling means 48 may comprise thin connecting elements that flex upon contact of rotor member 26 with secondary ring 46. Thus, flexible coupling elements 48 may comprise, for example, individual radial members or clusters of a plurality of small members such as tufts of bristles. If desired, an abradable rub strip 50 may be attached to the radially inward surface 52 of secondary ring 46. With the improved seal 40 illustrated in FIG. 2 and 3, a clearance gap 54 that is smaller than clearance gap 30 of FIG. 1 may be utilized. That is, clearance gap 54 can be substantially reduced to near the desired gap.

In normal operation, rotor member 26 will move radially within the gap 54 and no contact between the rotor and the secondary ring 46 will occur. During unusual transient movements of the rotor 26, however, contact between the rotor 26 and the secondary ring 46 may occur. If such contact occurs with the improved brush seal 40, secondary ring 46 will be deflected radially by bending of the thin, flexible support members 48 that extend across the gap between the primary and secondary rings 44 and 46. Thus, with the present invention, the secondary backing ring 46 is flexibly mounted to the primary backing ring 44 and can move away from the rotating member 26 during an engine transient so as to avoid damaging contact to both itself and the engine member 26. This flexible mounting of the secondary ring enables the engine designer to construct an engine wherein the size of the clearance gap 54 is not dictated by the radial transients experienced by the rotor member 26. Thus, because the pressure capacity of the seal is an inverse function of the backing or downstream plate gap, the pressure capacity of the seal can be dramatically increased by the ability to reduce the clearance gap size.

Figure 4:
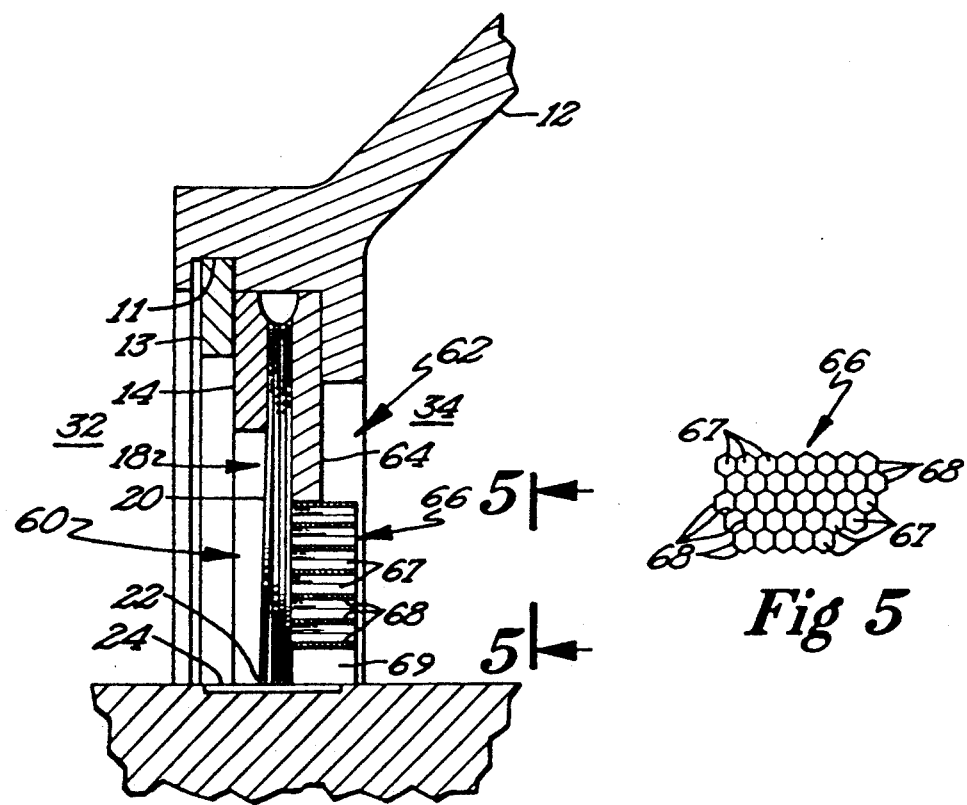
FIG. 4 shows another embodiment of the present invention wherein the downstream seal plate of the brush seal includes a primary and secondary ring, with the secondary ring formed of a honeycomb material.
Figure 5:
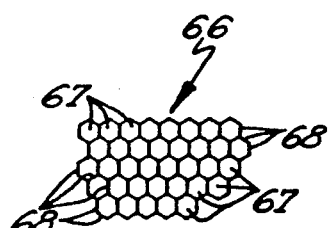
FIG. 5 is a partial end view taken along viewing plane 5—5 of FIG. 4 showing the honeycomb material useful in secondary ring embodiment shown in FIG. 4.

FIGS. 4 and 5 show another embodiment of the present invention wherein an improved brush seal 60 has a downstream plate 62 that includes a primary backing ring 64 and a secondary ring 66 composed of a honeycomb type of material, such as that used typically in labyrinth seal structures. As shown in FIG. 5, the honeycomb material comprises a plurality of cells 67 having walls 68 formed of thin layers of metal. When formed of a honeycomb material, secondary ring 66 will absorb radial excursions of rotating member 26 by crushing radially outwardly without the generation of large forces or frictional heat that would otherwise be encountered by contact between the inner surface 28 of downstream plate 16 of prior art brush seal 10. Thus, clearance gap 69 between secondary ring 66 and rotor 26 can be made smaller than clearance gap 30 of prior art brush seal 10, again resulting in an increase in seal capacity.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

We claim:

1. A brush seal for sealing a leakage gap between two relatively concentrically rotatable members, said leakage gap extending axially from a high pressure, upstream area to a low pressure, downstream area, said seal comprising upstream and downstream plates and a plurality of bristles sandwiched between said plates, said downstream plate including means for radially deflecting so as to avoid damaging contact with a said relatively movable member during transient operating conditions of said members, wherein said means for deflecting comprises said downstream plate including:
   a primary backing ring;
   a secondary backing ring, said secondary backing ring being disposed radially inwardly of said primary backing ring; and
   means for flexibly connecting said primary and secondary rings wherein said means for connecting comprises clusters of bristles.

2. The brush seal of claim 1 wherein said secondary ring further includes a radially inner surface and an abradable rub strip, said rub strip being attached to said radially inner surface of said secondary ring.

3. A brush seal for sealing a leakage gap between two relatively concentrically rotatable members, said seal comprising upstream and downstream plates and a plurality of bristles sandwiched between said plates, said downstream plate including means for radially deflecting so as to avoid damaging contact with a said relatively movable member during transient operating conditions of said members, wherein said means for deflecting comprises said downstream plate including:
   a primary backing ring; and
   a secondary backing ring, said secondary ring being attached to said primary ring and comprising a honey comb material.

4. A brush seal for sealing an annular axially extending leakage gap between a high pressure, upstream area and a low pressure, downstream area in a gas turbine engine, said gap existing between a stationary engine structure and a rotating engine structure, said structures being concentrically disposed relative to each other, said rotating structure being subject to transient operating conditions, said seal comprising spaced apart upstream and downstream plates each having an annular configuration and further comprising a plurality of bristles sandwiched between said plates, said seal being attached to said stationary structure with said bristles extending inwardly therefrom such that the tips of said bristles sealingly engage said rotating structure, wherein said downstream plate includes means for radially deflecting so as to avoid damaging contact with said rotating member during a transient operating condition of said rotating engine structure, wherein said means for deflecting comprises said downstream plate including:
   a primary backing ring;
   a secondary backing ring; and means for flexibly connecting said primary and secondary rings, wherein said means for connecting comprises clusters of bristles.

5. The brush seal of claim 4 wherein said secondary ring further includes a radially inner surface and an abradable rub strip, said rub strip being attached to said radially inner surface of said secondary ring.

6. A brush seal for sealing an annular axially extending leakage gap between a high pressure, upstream area and a low pressure, downstream area in a gas turbine engine, said gap existing between a stationary engine structure and a rotating engine structure, said structures being concentrically disposed relative to each other, said rotating structure being subject to transient operating conditions, said seal comprising spaced apart upstream and downstream plates each having an annular configuration and further comprising a plurality of bristles sandwiched between said plates, said seal being attached to said stationary structure with said bristles extending inwardly therefrom such that the tips of said bristles sealing engage said rotating structure, wherein said downstream plate includes means for radially deflecting so as to avoid damaging contact with said rotating member during a transient operating condition of said rotating engine structure, wherein said means for deflecting comprises said downstream plate including:
 a primary backing ring; and
 a secondary backing ring, said secondary ring being attached to said primary ring and comprising a honey comb material.

* * * * *